(12) United States Patent
Wong et al.

(10) Patent No.: US 8,645,276 B2
(45) Date of Patent: Feb. 4, 2014

(54) MODELING OF APPLICATIONS AND BUSINESS PROCESS SERVICES THROUGH AUTO DISCOVERY ANALYSIS

(75) Inventors: Wai Wong, Nissequogue, NY (US); Alan Young, Mount Sinai, NY (US)

(73) Assignee: CA, Inc., Islandia, NY (US)

( * ) Notice: Subject to any disclaimer, the term of this patent is extended or adjusted under 35 U.S.C. 154(b) by 1249 days.

(21) Appl. No.: 10/887,738

(22) Filed: Jul. 9, 2004

(65) Prior Publication Data

US 2005/0119905 A1 Jun. 2, 2005

Related U.S. Application Data

(60) Provisional application No. 60/486,317, filed on Jul. 11, 2003.

(51) Int. Cl.
H04L 29/06 (2006.01)
H04L 12/46 (2006.01)

(52) U.S. Cl.
USPC ............................. 705/50; 709/231; 709/223

(58) Field of Classification Search
USPC .................................. 705/1, 7; 709/223, 221
See application file for complete search history.

(56) References Cited

U.S. PATENT DOCUMENTS

| | | | |
|---|---|---|---|
| 5,428,619 A | 6/1995 | Schwartz et al. | 371/20.1 |
| 5,826,239 A | 10/1998 | Du et al. | 705/8 |
| 5,948,055 A | 9/1999 | Pulsipher et al. | 709/202 |
| 5,978,594 A | 11/1999 | Bonnell et al. | 395/837 |
| 6,233,537 B1 | 5/2001 | Gryphon et al. | 395/837 |
| 6,332,163 B1 * | 12/2001 | Bowman-Amuah | 709/231 |
| 6,349,404 B1 | 2/2002 | Moore et al. | 717/1 |
| 6,370,573 B1 * | 4/2002 | Bowman-Amuah | 709/223 |
| 6,427,132 B1 * | 7/2002 | Bowman-Amuah | 703/22 |
| 6,434,568 B1 * | 8/2002 | Bowman-Amuah | 707/103 R |
| 6,457,143 B1 | 9/2002 | Yue | 714/43 |
| 6,529,950 B1 | 3/2003 | Lumelsky et al. | 709/218 |
| 6,564,174 B1 | 5/2003 | Ding et al. | 702/186 |
| 6,662,357 B1 * | 12/2003 | Bowman-Amuah | 717/120 |
| 6,721,713 B1 * | 4/2004 | Guheen et al. | 705/1 |
| 6,853,994 B1 | 2/2005 | Gupta | 707/6 |
| 6,944,630 B2 | 9/2005 | Vos et al. | 707/104.1 |
| 7,912,749 B2 | 3/2011 | Wong et al. | 705/11 |
| 2002/0038228 A1 | 3/2002 | Waldorf et al. | 705/7 |

(Continued)

FOREIGN PATENT DOCUMENTS

EP 1 118 952 A2 7/2001
WO WO 99/45468 9/1999

(Continued)

OTHER PUBLICATIONS

European Search Report for Int'l Application No. EP 04 75 6807 (Computer Associates Think, Inc.); Place of Search: The Hague; 3 pp., Nov. 7, 2006.

(Continued)

*Primary Examiner* — Evens J Augustin
(74) *Attorney, Agent, or Firm* — Baker Botts, L.L.P.

(57) ABSTRACT

A method for managing information technology (IT) through auto discovery analysis to achieve business relevance is provided. An IT infrastructure is monitored to discover managed components of the infrastructure and discover business processes which are supported by the infrastructure. An information model is formed based on the discovered components and the discovered business processes. The information model can be used to provide assorted IT services.

44 Claims, 7 Drawing Sheets

(56) References Cited

U.S. PATENT DOCUMENTS

| | | | |
|---|---|---|---|
| 2002/0062237 A1 | 5/2002 | Matsumoto et al. | ............... 5/7 |
| 2002/0147937 A1 | 10/2002 | Wolf | ............... 714/4 |
| 2002/0169658 A1* | 11/2002 | Adler | ............... 705/10 |
| 2002/0174222 A1 | 11/2002 | Cox | ............... 709/224 |
| 2003/0046390 A1 | 3/2003 | Ball et al. | ............... 709/224 |
| 2003/0097245 A1 | 5/2003 | Christodoulou et al. | ....... 703/13 |
| 2003/0097425 A1 | 5/2003 | Chen | ............... 709/220 |
| 2004/0064543 A1 | 4/2004 | Ashutosh et al. | ............... 709/224 |
| 2004/0138933 A1* | 7/2004 | LaComb et al. | ............... 705/7 |
| 2004/0138936 A1* | 7/2004 | Johnson et al. | ............... 705/7 |
| 2005/0125449 A1 | 6/2005 | Wong et al. | ............... 707/104.1 |
| 2005/0125450 A1 | 6/2005 | Wong et al. | ............... 707/104.1 |
| 2005/0125768 A1 | 6/2005 | Wong et al. | ............... 717/100 |

FOREIGN PATENT DOCUMENTS

| | | | |
|---|---|---|---|
| WO | WO 01/91369 | 11/2001 | ............ H04L 12/00 |
| WO | WO 02/48910 A1 | 6/2002 | |
| WO | WO 02/079928 A2 | 10/2002 | |

OTHER PUBLICATIONS

PCT International Search Report for International Application No. PCT/US04/21980, filed Jul. 9, 2004 (2 pages), Sep. 23, 2005.

PCT Written Opion of the International Searching Authority for International Application No. PCT/US04/21980, filed Jul. 9, 2004 (3 pages), Sep. 23, 2005.

USPTO, *Advisory Action Before the Filing of an Appeal Brief*, U.S. Appl. No. 10/888,772, Sep. 26, 2008.

PCT Notification of Transmittal of the International Search Report and the Written Opinion of the International Searching Authority regarding PCT/US04/22142, mailed May 08, 2007.

Supplementary European Search Report regarding PCT/US04/022142, mailed Mar. 28, 2008.

*USPTO Final Office Action* for U.S. Appl. No. 10/888,262, filed Jul. 9, 2004, Inventor Wai Wong, Examiner Eric Charles Wai, (9 pages), Jan. 22, 2010.

*USPTO Non-final Office Action*, Wong et al., U.S. Appl. No. 10/887,652, filed Jul. 9, 2004, (10 pages), Mar. 17, 2008.

*USPTO Final Office Action*, Wong et al., U.S. Appl. No. 10/887,652, filed Jul. 9, 2004, (9 pages), Oct. 1, 2008.

*USPTO Non-final Office Action*, Wong et al., U.S. Appl. No. 10/888,772, filed Jul. 9, 2004, (10 pages), Jan. 11, 2007.

*USPTO Final Office Action*, Wong et al., U.S. Appl. No. 10/888,772, filed Jun. 26, 2007, (14 pages), Jun. 26, 2007.

*USPTO Non-final Office Action*, Wong et al., U.S. Appl. No. 10/888,772, filed Jul. 9, 2004, (15 pages), Nov. 30, 2007.

*USPTO Final Office Action*, Wong et al., U.S. Appl. No. 10/888,772, filed Jul. 9, 2004, (14 pages), Jul. 11, 2008.

*USPTO Non-final Office Action*, Wong et al., U.S. Appl. No. 10/888,772, filed Jul. 9, 2004, (16 pages), Aug. 18, 2009.

*USPTO: Office Action* for U.S. Appl. No. 10/888,262, filed Jul. 9, 2004, in re: Wong et a.; (9 pages), May 14, 2009.

ThoughtWorks, The art of heavy lifting. "Web Services: Pathway to a Service-Oriented Architecture". 2002, (11 pages), 2002.

IT Architect Advisor. "Use the Right Architecture to Achieve Business Relevance," Spring of 2003, (18 pages), 2003.

IT Architect Advisor, "Optimize and Self-Manage IT Infrastructure." Spring 2003, (11 pages), 2003.

IT Architect Advisor. "Achieve the Ultimate: Run IT as a Service Business." Spring 2003, (10 pages), 2003.

Martin Fowler et al., "Patterns of Enterprise Application Architecture." Pearson Ed., Inc. 2003 (86 pages).

USPTO *Office Action* Summary, U.S. Appl. No. 10/887,652, filed Jul. 9, 2004, in re: Wai Wong, (7 pages). Dec. 22, 2009.

USPTO *Office Action*, U.S. Appl. No. 10/888,772, filed Jul. 9, 2004, in re: Wai Wong, (22 pages), Mar. 14, 2011.

USPTO *Office Action*, U.S. Appl. No. 10/888,772, filed Jul. 9, 2004, in re: Wai Wong, (25 pages), Apr. 28, 2010.

USPTO *Office Action*, U.S. Appl. No. 10/888,772, filed Jul. 9, 2004, in re: Wai Wong, (23 pages), Sep. 7, 2011.

Wong et al., U.S. Appl. No. 10/888,772, *Response Pursuant to 37 C.F.R. § 1.111*, (11 pages), Apr. 11, 2007.

Wong et al., U.S. Appl. No. 10/888,772, *Notice of Appeal and Pre-Appeal Brief Request for Review*,(7 pages), Aug. 17, 2007.

USPTO, *Notice of Panel Decision from Pre-Appeal Brief Review*, U.S. Appl. No. 10/888,772, (2 pages), Sep. 19, 2007.

Wong et a., U.S. Appl. No. 10/888,772, *Response Pursuant to 37 C.F.R. § 1.111*, (10 pages), Feb. 28, 2008.

Wong et al., U.S. Appl. No. 10/888,772, *Response Pursuant to 37. C.F.R. § 1.116*, (10 pages), Sep. 10, 2008.

USPTO, *Advisory Action Before the Filing of an Appeal Brief*, U.S. Appl. No. 10/887,772, (3 pages), Sep. 26, 2008.

Wong et al., U.S. Appl. No. 10/888,772, *Notice of Appeal and Pre-Appeal Brief Request for Review*, (6 pages), Oct. 14, 2008.

USPTO, *Notice of Panel Decision from Pre-Appeal Brief Review*, U.S. Appl. No. 10/888,772, (2 pages), Nov. 21, 2008.

Wong et al., U.S. Appl. No. 10/888,772, *Appeal Brief*, (26 pages), Dec. 22, 2008.

USPTO, *Examiner's Answer*, U.S. Appl. No. 10/888,772, filed Jul. 9, 2004, in re: Wai Wong, (15 pages)—Apr. 3, 2009.

Wong et al., U.S. Appl. No. 10/888,772, *Request for Continued Examination Transmitted and Amendment Accompanying Request for Continued Examination*, (10 pages), Jun. 2, 2009.

Wong et a.., U.S. Appl. No. 10/888,772, *Response Pursuant to 37 C.F.R. § 1.111*, (14 pages), Nov. 18, 2009.

Wong et al., U.S. Appl. No. 10/888,772, *Response Pursuant to 37 C.F.R. §1.111*, (14 pages), Ju. 28, 2010.

USPTO, *Final Office Action*, U.S. Appl. No. 10,888,772, filed Jul. 9, 2004, in re: Wai Wong, (22 pages), Oct. 14, 2010.

Wong et al., U.S. Appl. No. 10/888,772, *Response Pursuant to 37 C.F.R. §1.116*, (16 pages), Dec. 14, 2010.

USPTO, *Advisory Action Before the Filing of an Appeal Brief*, U.S. Appl. No. 10/887,772, 3 pages, Dec. 29, 2010.

Wong et al., U.S. Appl. No. 10/888,772,*Notice of Appeal and Pre-Appeal Brief Request for Review*, (7 pages), Jan. 14, 2011.

USPTO, *Notice of Panel Decision from Pre-Appeal Brief Review*, U.S. Appl. No. 10/888,772, (3 pages), Mar. 4, 2011.

Wong, et al., U.S. Appl.. No. 10/888,772 *Response Pursuant to 37 C.F.R. § 1.111*, (14 pages), Jun. 14, 2011.

Wong et al., U.S. Appl. No. 10/888,772, *Response Pursuant to 37 C.F.R. §1.116*, (13 pages), Oct. 12, 2011.

USPTO, *Advisory Action*, U.S. Appl. No. 10/888,772, filed date Jul. 9, 2004, in re: Wai Wong, (3 pages), Oct. 21, 2011.

Wong, et al., U.S. Appl. No. 10/888,772, *Notice of Appeal and Pre-Appeal Brief Request for Review*, (7 pages), Dec. 6, 2011.

USPTO, *Notice of Panel Decision from Pre-Appeal Review*, U.S. Appl. No. 10/888,772, (2 pages), Feb. 27, 2012.

Wong, et al., U.S. Appl. No. 10/888,772, *Appeal Brief*, (124 pages), Mar. 27, 2012.

USPTO, *Examiner's Answer*, U.S. Appl. No. 10/888,772, (25 pages), Jun. 15, 2012.

Wong, et al., U.S. Appl. No. 10/888,262, *Response Pursuant to 37 C.F.R. § 1.111*, (10 pages), Aug. 24, 2009.

USPTO, *Notice of Non-Compliant Amendment*, U.S. Appl. No. 10/888,262, filed Jul. 9, 2004, in re: Wai Wong, (2 pages), Oct. 13, 2009.

Wong et al., U.S. Appl. No. 10/888,262, *Response to Noncompliant Amendment*, (10 pages), Nov. 2, 2009.

Wong, et al., U.S. Appl. No. 10/888,262, *Response Pursuant to 37 C.F.R. § 1.116*, (15 pages), Mar. 1, 2010.

USPTO, *Advisory Action Before for Filing of an Appeal Brief*, U.S. Appl. No. 10/888,262, filed Jul. 9, 2004, in re: Wai Wong, Mar. 16, 2010.

Wong, et al., U.S. Appl. No. 10/888,262, *Request for Continued Examination Transmittal*, (1 page), Apr. 5, 2010.

USPTO, *Non-Final Office Action*, U.S. Appl. No. 10/888,262, filed Jul. 9, 2004, in re: Wai Wong, (11 pages), Jul. 21 2011.

(56) References Cited

OTHER PUBLICATIONS

Wong et al., U.S. Appl. No. 10/888,262, *Response Pursuant to 37 C.F.R. § 1.111,* (13 pages), Oct. 17, 2011.
USPTO, *Final Office Action,* U.S. Appl. No. 10/888,262, filed Jul. 9, 2004, in re: Wai Wong, (10 pages), Jan. 20, 2012.
Wong et al., U.S. Appl. No. 10/888,262, *Response Pursuant to 37 C.F.R. § 1.116,* (15 pages), Mar. 2, 2012.
USPTO, *Notice of Allowance and Fee(s) Due,* U.S. Appl. No. 10/888,262, filed Jul. 9, 2004, in re: Wai Wong, (9 pages), Jun. 8, 2012.

* cited by examiner

MODELING OF APPLICATIONS AND BUSINESS PROCESS SERVICES THROUGH AUTO DISCOVERY ANALYSIS

CROSS-REFERENCE TO RELATED APPLICATION

This application claims the benefit of commonly owned U.S. Provisional Application No. 60/486,317, filed Jul. 11, 2003 and entitled "MODELING OF APPLICATIONS AND BUSINESS PROCESS SERVICES THROUGH AUTO DISCOVERY ANALYSIS".

TECHNICAL FIELD

This application relates to information technology. In particular, the application relates to modeling of applications and business process services through auto discovery analysis.

DESCRIPTION OF RELATED ART

In the current information age, information technology (IT) plays a substantial role in enterprise and business management, in most instances. Many enterprises and businesses struggle, however, to maintain an IT system which allows them to stay competitive against their competitors.

In particular, enterprises and businesses typically study and consider the return-on-investment of IT offerings on the market. While conventional IT products and services usually remain static over their lifetimes or can be reconfigured only manually through substantial time and effort, the IT needs of an enterprise or business can change rapidly, sometimes even on a daily basis, according to business priorities.

There is a continuing need for IT infrastructure which can dynamically adapt according to business priorities and remain relevant to business objectives.

SUMMARY

The application provides methods for managing information technology (IT) through auto discovery analysis to achieve business relevance. In one embodiment, the method includes providing one or more IT services to monitor an IT infrastructure and thereby discover managed components of the infrastructure and discover business processes which are supported by the infrastructure, and forming an information model based on the discovered components and the discovered business processes.

The auto discovery analysis can include one or more of the following: performing network elements discovery; performing systems discovery; performing network flow discovery; performing batch process discovery; and performing middleware integration discovery.

BRIEF DESCRIPTION OF THE DRAWINGS

The features of the present application can be more readily understood from the following detailed description with reference to the accompanying drawings wherein.

DETAILED DESCRIPTION

Figure 1A:
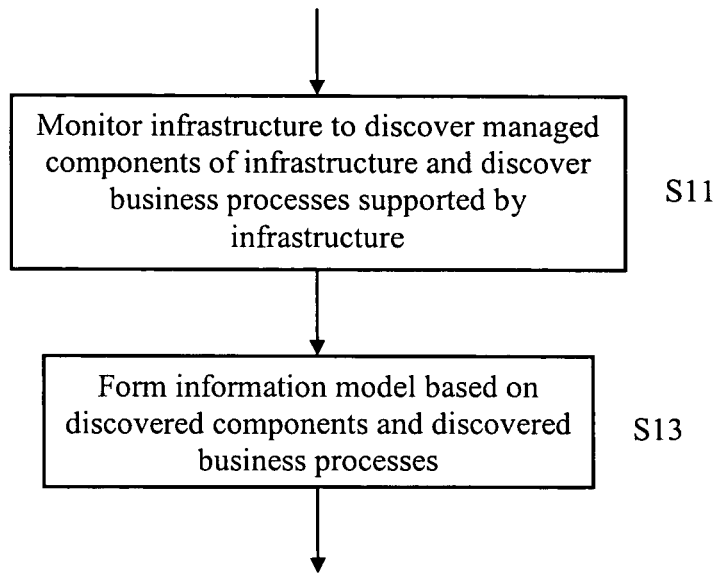
FIG. 1A shows a flow chart of a method for modeling of applications and business process services through auto discovery analysis, according to an embodiment of the present application.

This application provides tools for modeling of applications and business process services through auto discovery analysis. The tools may be embodied in a computer program stored on a computer readable medium and/or transmitted via a computer network or other transmission medium.

The tools provide the capability to automatically discover and record, on an ongoing basis, the managed elements of the infrastructure together with the business processes that are being supported, and perform a mapping of dependency relationships between those parts.

Automatic discovery includes discovery of managed components of an IT infrastructure. The following auto discovery paradigms may be included to provide for an automated, robust and meaningful grouping of the components as they support relevant business processes: network elements discovery; systems discovery; network flow discovery; batch process discovery; and middleware integration discovery. Auto discovery may include discovery of managed components such as networks, systems, applications, business processes, agents, database objects, applications, IT hardware, etc.

The methodologies also include discovery and rendition of business process, broken down to its constituent parts as represented by infrastructure elements.

Network data traffic and pattern flows may be analyzed for automatic discovery of infrastructure mapping to business process. Network flows allow the ability to interpret which piece of the IT infrastructure is communicating with another piece of the infrastructure. The network flows may be analyzed to map distinct groupings of the IT infrastructure to the type of communication traffic. The mapping can then be modeled to represent sets of fundamental business processes, as relevant between the IT infrastructure and the model of these sets of processes. As one layer of an auto discovery methodology, automatic modeling of groups of IT processes can be mapped and visualized as being relevant to appropriate applications.

Automatic discovery of IT infrastructure may include analysis of batch processing flows.

Batch processing is a process by which large volumes of data are collected over time, and then are processed at once, typically at a selected time at which resources are typically not otherwise in great demand. In many instances, data communications for batch processing are grouped together. For example, data for transactions by a business may be collected during the course of a business day, and transmitted to data processing facilities at the end of the business day, to be processed at a scheduled time during the business off-time of that day.

Analysis of batch processing flows allow the ability to integrate back office operations around commercial as well as custom built applications. Analysis of batch processing flows allows mapping of distinct business processes as relevant to the IT infrastructure and modeling of the sets of processes. As one layer of an auto discovery methodology, automatic modeling of functional IT processes can be mapped and be made relevant to the appropriate applications, according to batch processing flows.

Automatic discovery of IT infrastructure for business process models may include analysis of middleware flows.

Middleware can be any programming that serves to glue together or mediate between disparate software systems. Middleware facilitates communications between different applications, such as by providing messaging service. For example, the middleware may run on a server to allow clients to access a database connected to the server, including managing communications between a client program and a database. As another example, middleware can act as an application processing gateway or a routing bridge between remote clients and data sources or other servers, and may control the transmission of data exchange over a network. Thus, applications can invoke services through middleware. In many instances, the middleware allows for greater interoperability between different systems and applications, and shields users and developers from differences imposed by incompatible operating environments. In addition, middleware can also form a virtual application with real-time access to business processes.

IT processes may be integrated around commercial as well as custom built applications according to analysis of middleware flows. Distinct business processes may be mapped as relevant to the IT infrastructure, and the mapping of processes to infrastructure may be modeled. As one layer of an auto discovery methodology, the automatic modeling of functional IT processes can be mapped and made relevant to the appropriate applications according to middleware flows.

A method for modeling of applications and business process services through auto discovery analysis, according to one embodiment, will be described with reference to FIG. 1A. An infrastructure is monitored to discover managed components of the infrastructure and discover business processes which are supported by the infrastructure (step S11). An information model is formed based on the discovered components and the discovered business processes (step S13). The information model may include representations of IT processes. The method may further include mapping the discovered business processes to the components supporting the business processes.

Figure 1B:
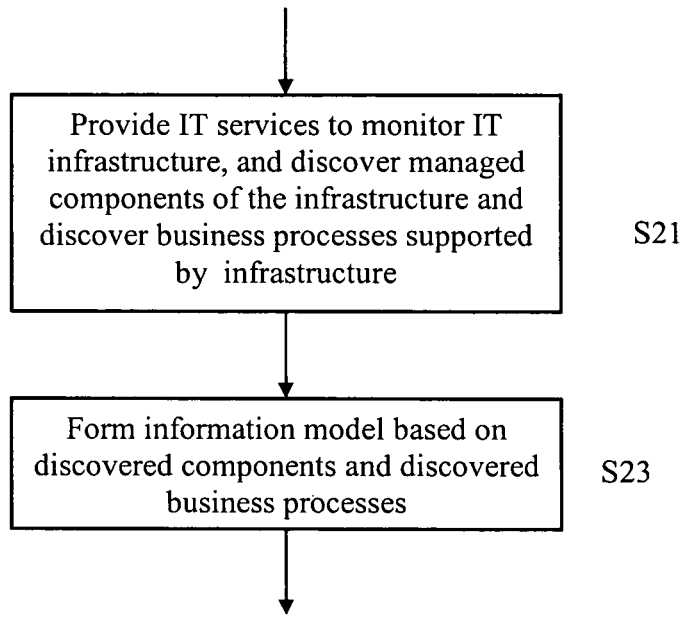
FIG. 1B shows a flow chart of a method, according to another embodiment, for managing information technology (IT) through auto discovery analysis to achieve business relevance.

According to another embodiment (FIG. 1B), a method for managing information technology (IT) through auto discovery analysis to achieve business relevance may be provided. The method for managing IT through auto discovery analysis to achieve business relevance can include providing one or more IT services to monitor an IT infrastructure and thereby discover managed components of the infrastructure and discover business processes which are supported by the infrastructure (step S21), and forming an information model based on the discovered components and the discovered business processes (step S23). The information model may include representations of IT processes. The method may further include mapping the discovered business processes to the components supporting the business processes. The one or more IT services may include IT asset management.

The method for managing IT through auto discovery analysis to achieve business relevance, according to another exemplary embodiment, can also include collecting business data from one or more data sources, analyzing the collected business data using the information model, and predicting one or more business events based the analysis of the collected business data. The method may further comprise automating a response to the one or more predicted business events. The predicted business events may include one or more service violations and/or information technology outages.

According to another exemplary embodiment, the method for managing IT through auto discovery analysis to achieve business relevance may further comprise providing means for visualizing the information model. The method also or alternatively can include providing a view of a business impact of a predicted business event. The business impact view can include prediction of financial impact, operational impact and/or customer impact. The business impact view also or alternatively can include a view of projected effect of the predicted business event on performance, service availability, system configuration, job management and/or IT asset management.

The method may further comprise using the information model for client device management, server provisioning, resource analysis, availability and performance management, job management, output management, and/or service provisioning, delivery and/or support.

According to another exemplary embodiment, the method for managing IT through auto discovery analysis to achieve business relevance may further include providing common services applicable across business processes, functions and/or applications. The method also or alternatively can further include using the information model for security services, information transparency services, state management services, workflow services, self-management services, self-description services, and/or knowledge services.

The method for managing IT through auto discovery analysis to achieve business relevance, according to another exemplary embodiment, can also include performing network elements discovery, performing systems discovery, performing network flow discovery, performing batch process discovery, and/or performing middleware integration discovery.

Figure 2:
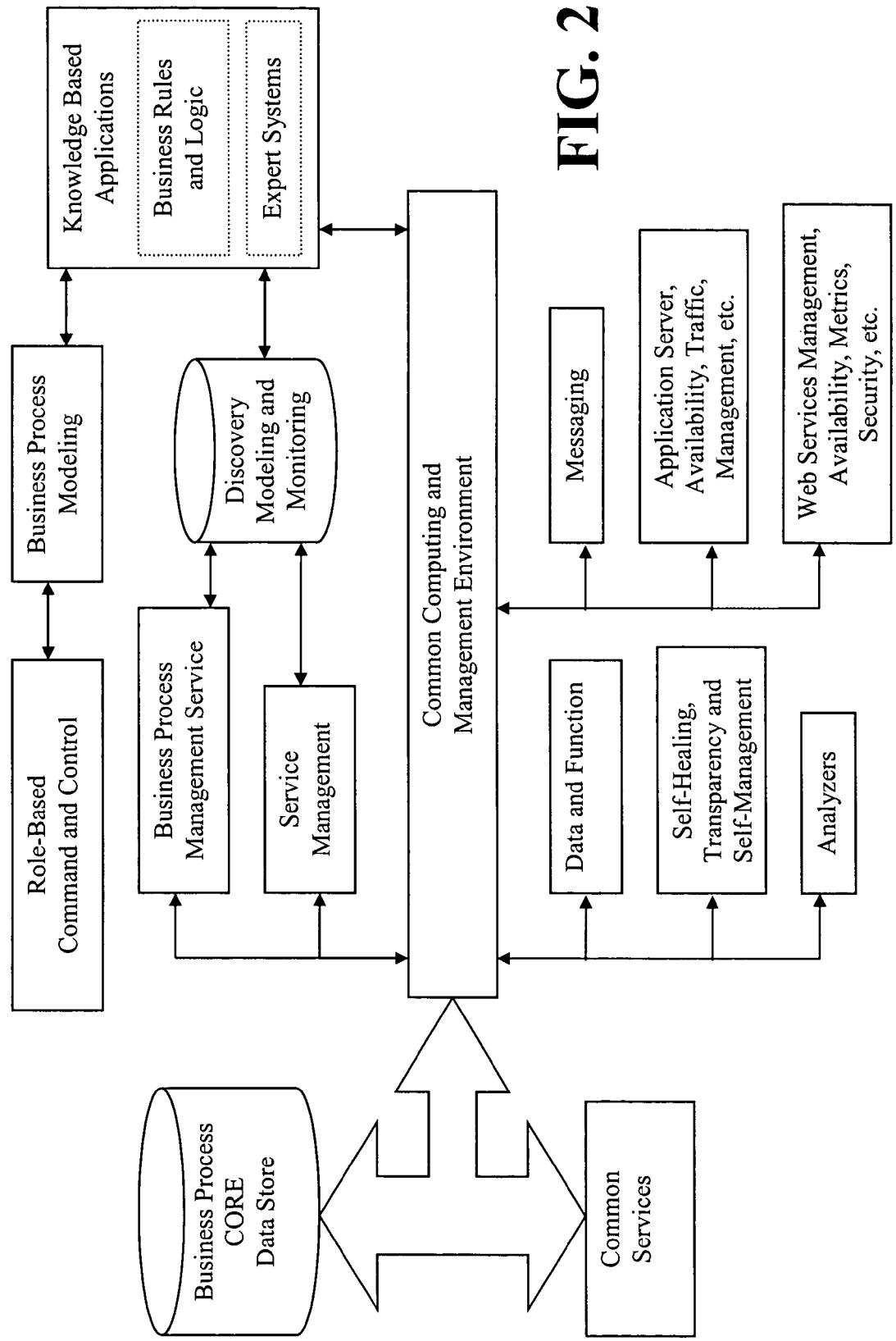
FIG. 2 shows a schematic diagram of an exemplary heterogeneous IT infrastructure.
Figure 3:
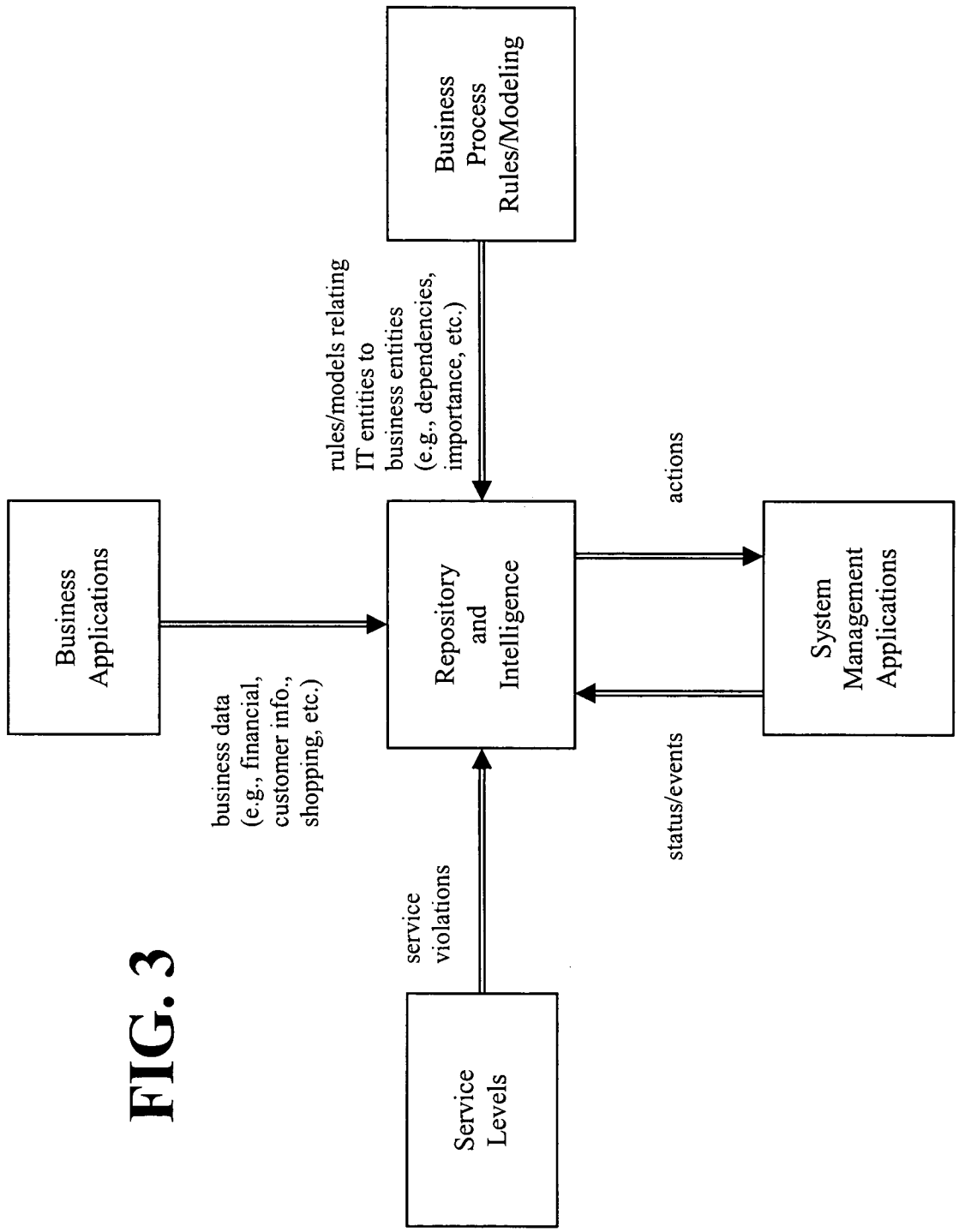
FIG. 3 shows a schematic representation of a system for achieving business relevance, according to one exemplary embodiment.

A schematic diagram of an exemplary infrastructure in which the methodologies of this application can be applied is shown in FIG. 2.

Additional exemplary embodiments are discussed below with reference to FIGS. 3-7.

For example, management of on-demand computing may integrate adaptive IT with business management (also referred to as "achieving business relevance"). An architectural baseline which applies the methodologies of this application to achieve business relevance is discussed below. The tools of this disclosure, for business-centric technology management, can provide a seamless, efficient and powerful path to essential enterprise responsiveness.

Business relevance is achieved when you provide information and management capability that directly responds to, and supports, decision-making within the context of business goals and objectives at all levels, from departmental through line of business to executive management.

Dynamic alignment of IT with business priorities defines business relevance within the context of managing on-demand computing. In addition to providing better managed infrastructure, though that is certainly one of our goals, an ability to view an event or change within the infrastructure through the lens of business priorities is provided.

For example, if a person (or a set of pre-defined policies) is delegated the responsibility of managing availability of a set of physical resources (such as application servers), how is the relative importance of any one of the servers determined on a demand priority basis? If multiple servers degrade or fail, automated recovery fails, and only one technician is available, how is the business impact determined accurately enough to focus the technician on the right server first?

One conventional practice for IT management is establishing specific, measurable service level objectives within an overall service level agreement that forms the contractual basis for support levels given to the business customers of IT. However, a relatively static service level objective, in a typical set of incidents which occur within a rapidly changing business environment, does not allow for dynamically aligning IT with business priorities.

A base level of capability for determining business impact at any point in time is an understanding of the relationships between all the constituent parts of the IT stacked up through the business process level. In the example of multiple application servers, business impact typically cannot accurately be gauged without first knowing what part of the business is affected. An ability to discover and record, on an ongoing basis, the managed elements of the infrastructure together with the business processes that are being supported, and the full relationship between those parts is highly desirable. A system enabling analysis of business impact is shown schematically in FIG. 3.

Service level objectives tend not to be fine-grained enough to map to a specific business process at an arbitrary point in time. An application server in some instances can be mapped to a department or line of business (for example, a customer of IT). However, discovery and rendition of business process, broken down to its constituent parts as represented by infrastructure elements, is still needed.

Although a static instance of a business process is a start to dynamically align IT with business priorities, it does not achieve truly dynamic capability. The attributes of business processes as they change during business execution are taken into account to achieve dynamism for business alignment. A business process model, as a proxy for a real, executing business process with values for properties that reflect its true state at a point in time, is one of the tools for achieving the desired dynamism.

Process state may be considered to manage against a configured or observed "baseline" state. Policies may be enacted, for deviations from the baseline, to return to the baseline or desired state. Policy, of course, may involve a combination of human and/or automated actions.

Even a desired state is not a static view, and can change as the business context changes and can also be modified by notions of criticality as defined by competing business priorities. The relative priorities of ongoing business processes at an arbitrary point in time is a factor for determining the relative impact of deviation from desired state for a process. The desired state may be adjusted either temporarily or permanently to reflect changing business priorities.

Although enterprise desired state is inherently complex, its accurate real-time representation is achievable. By using, for example, a standard modeling language (UML), a common vocabulary and principles such as specializations, an accurate and useful model of the managed environment can be derived from an agreed-upon stable abstract information model. After desired state information is captured through the standard model, it can be dynamically managed through automated policy and role-based command and control.

Some enabling characteristics of business relevance include delivery of IT as a service and self-management built upon a service-oriented architecture. Standard, flexible and dynamic access to information and services may be provided across the entire IT management portfolio, including integration with third-party management applications. Empowerment of roles, from helpdesk support through executive decision maker, may be provided to dynamically define and provision services that most closely meet organization objectives. Routine service support tasks may be automated.

The highest-level characteristics of an information model that facilitate specification of an architectural baseline for business relevance, according to one embodiment, are that the information model is (a) object-based, (b) policy-driven, (c) secure and role-based, (d) self-managing, (e) self-descriptive and (f) capable of providing information transparency. These characteristics allow one to decompose the problem of how to define a service-oriented architecture that enables delivery of IT as a service through self-management, and the benefits of business alignment, responsiveness, and efficiency.

Each entity in the architecture can be described as an object derived from some combination of elements in the information model, and therefore the enterprise and its state and associated business processes can be modeled with a useful degree of accuracy and completeness, and the relationships and effects of the rest of the model, such as allowing objects to be policy-driven within a secure and role-based view, can be defined.

Self-description facilitates dynamic interoperability. By first agreeing upon common semantics as defined by the information model, then adding the ability for any object to ask and discover the characteristics of any other object, the static brittleness that is typical of manually-defined and configured systems can be replaced with dynamic interoperability that, in turn, supports the ability to be self-managed.

The capability to study information and data at various viewpoints and abstractions enables business relevance. Visualizing elements and understanding the complicated relationships that exist between them provides the capability for obtaining a comprehensive picture about what exists in the business today. By capturing the information in a standard visual format, the hidden relationships that exist between the elements can extracted to bring out significant business relevant value.

A meta-model may be provided to define a language for specifying models in the business management environment. The meta-model can have the capability to describe dynamic semantics. Some examples of objects in the meta-model layer include class, attribute, operation, associations, component, etc.

An information model, which may be provided as an abstract model, identifies and categorizes a set of classes that, when inherited, represents the management environment. This can be viewed as the most abstract view of a management environment. The identification and categorization process is preferably agnostic to any specific repository, context, protocol, or platform. Some examples of classes are business process, device, etc.

A core model may be provided to define a collection of abstract classes that provide a basic vocabulary for analyzing and describing management environments. The core model represents a starting point for an analyst to determine how to extend the core models to create domain models. Some examples of abstract classes are transaction, customer, etc.

A domain model may be provided as a basic set of classes that define various domains in the management environment. The environment may consist of domains such as devices, networks, systems, applications, users, services and business processes. The classes in the domain model are intended to provide a view of the area that's detailed enough to use as a basis for component design and, in some cases, implementation. A domain model is typically less stable as compared to a core model as a result of promotion of classes defined in the extension models, additional classes as a result of changes to the domain model, and changes due to introduction of new domains. Some examples of classes are network printer, systems manager, etc.

Extension models are extensions to the domain model. The extensions allow users of the domain model to create context sensitive models in support of a specific implementation of a domain. For example, a product development group might decide to create a payroll process model by extending the business process model.

The models can be viewed as abstractions of elements in the managed environment. Domain models capture the elements closest to the day-to-day environment. Relevant domain experts can create these models. Concepts that appear across multiple domain models can be abstracted (such as through a generalization process) and put in the core model, in order to allow the architecture to establish business relevant relationships at a more abstract level. This process can be followed to abstract elements from the core model to the information model. The extension model gives the flexibility to ground the domain models and represent the real world precisely.

The information model and the core model are typically more stable as the architecture matures by modeling multiple domains. The two models are the source for defining domain models (the generalization process defer to the specialization process). The stability of the information model and the core model allow valuable business relevant data to be discovered because the models provide a view of elements across different domains. The business relevant information model forms a basis of interoperability.

Systems that makes IT management business relevant depend, to a significant extent, on a clear understanding of the goals and capabilities of the proposed system. IT infrastructure is managed to support real-time business objectives efficiently, superceding the techno-centric focus of conventional approaches.

Enabling an authorized user simple access to role-relevant services and information in an easy-to-use fashion significantly streamlines consumption of IT resources, and maximizes operational and capital investments.

An IT infrastructure preferably has capabilities to adapt automatically to technical malfunctions through superior analytics for diagnostics. Self-healing procedures may be provided, and infrastructure optimization can be addressed through dynamic resource management and embedded service awareness.

Products and services instantiated to achieve the stated goals preferably have the following characteristics: distributed, available, scalable, adaptable, evolutionary, interoperable, predictable and agile. These types of systems are often characterized by non-trivial, implicit, and complex relationships between the parts that make up the system. An architectural baseline is a catalyst for simplifying the process of identification and structured organization of the major parts of the system.

Software modules may be organized in libraries. The individual modules of the library are referred to as patterns while the library itself is referred to as catalog of patterns. Patterns may further be categorized based on their scale and abstraction as architectural patterns, design patterns and language patterns.

An architectural pattern expresses a fundamental structural organization schema for software systems. It provides a set of predefined subsystems, specifies their responsibilities, and includes rules and guidelines for organizing the relationships between them.

Subsystems, or software parts, represent discrete functionality. A software part is often referred to as a service.

Business relevance services are geared toward achieving the principles of self-management, service-oriented architecture and delivering IT as a service, and provide organizational and role-based contexts for delivering solutions. The services transcend the traditional disciplines of network, systems, and application management, or performance, availability and change management. Business relevance services may include IT asset management, client device management, server provisioning, resource analysis and reporting, availability and performance management, enterprise job management, enterprise output management, service provisioning, service delivery, service support, etc.

The IT asset management services provide insight into IT assets and their hardware and software elements across each and every stage of their lifecycle. Costs are controlled, efficiencies improved and return on investment (ROI) maximized through comprehensive configuration control, business reporting and analysis.

The client device management services propel end-user client device management from domain-based to enterprise-wide control, where it seamlessly supports the end-user computing needs of the business. Crossing all technical and organizational boundaries, its automated features reduce IT staff time spent distributing software, tracking assets and managing remote systems—keeping the asset base up and running on a day-to-day basis.

The server provisioning services transform the resource-intensive, manual procedures involved with provisioning servers into automated processes driven by business priorities. From automated reconfiguration to deployment of complex applications across servers, server provisioning ensure agile, efficient use of human and server resources.

The resource analysis services provide access to information joining historical and current sources for resource utilization, trend analysis and resource constraints. By providing systematic performance measurement of service levels and costs, businesses can proactively respond to changing business requirements for resource deployment.

The availability and performance management services provide network, systems, database, application and web infrastructure management. Availability and performance services utilize advanced analytic capabilities to support cross-domain process management, such as dynamic discovery, advanced event correlation for cross-domain root-cause analytics, extended topology, impact analysis, etc.

Across the enterprise, thousands of (or more) jobs, such as database backups and order processing, may be processed every day to support the business. If one of the jobs fails, the consequences can be catastrophic. For example, inventory might not be replenished, customers might not receive bills, inaccurate information can appear while workers are using databases, etc. The enterprise job management services provide enterprise-wide visualization of schedules and individual job flows, integration with vendor packages, workload balancing and analysis, and advanced calendaring for job flow modeling The output management services ensure that the right information in the right format is provided to the right audience across the entire enterprise, including secure document delivery, printing, viewing and storing, and classification for advanced distribution to individuals and groups.

Service provisioning allows IT services to be described, cataloged and validated for deployment. Required infrastructure elements can be verified in advance to ensure adequate service level capability.

Service delivery services allow for easy definition, measurement and monitoring of agreed-upon service quality levels. By aggregating information from across and through the IT stack, defined services can be enabled for metric-based exception processing when service level deviations occur.

Service support enables resources, such as hardware, software, network devices, etc., to become service aware (for example, integrated with the service environment, exchanging information on their service needs, etc.). Service aware integration allows for participating applications and services to seamlessly expose infrastructure service needs that can impact business processes.

Common services define application-level functions that are applicable across business processes, functions, and applications. Examples of common services include service brokers, notification services, scheduling services, workflow services, registration and discovery services, additional services discussed below, etc.

Roles constitute an appropriate part of the information and are a fundamental part of the principle of delivering IT as a service. Security services may focus on authentication and authorization mechanisms. Role services use the security infrastructure to create policy-driven mapping between level of security and levels of information. The security and role services that collaborate to achieve role-based secure access use the information model as an underlying information exchange mechanism.

Creating useful information from multiple (possibly disparate) data sources is a significant task. However, business relevance demands appropriate, consistent and correlated information rather than scattered volumes of data. Information transparency services enable graduation of discrete real-time or historical data sources to useful information sources. The process involves aggregation and transformation of data sources by using well-defined aggregation and transformation rules and an information model as the basis for information exchange.

States indicate the ability of the enterprise to perform its core tasks. Services that participate in or enable state management are characterized as state management services. State management services also may act as triggers to other services, such as self-management services, in order to reach a desired state from an undesirable state. State management services depend on information model compliance to provide higher levels of automation.

Workflow services enable a simplified and streamlined automation of enterprise class business processes, operations, tasks, and transactions. Workflow services may incorporate services for mapping, modeling and execution of the processes, operation, tasks or transactions. Mapping is a stage in the adoption of a workflow service and involves the task of discovering and recording manual and automatic business processes, tasks or transactions. The modeling process transforms the map into a formal workflow model and is in turn consumed by the execution services to automate the tasks at hand.

Self-management services enable IT organizations to automatically respond to, and compensate for, fluctuations in IT environment to attain a desired state. The desired state, in this context, is typically determined by business priorities. For example, self-management services may allow a web site to automatically bring more servers online to handle an unexpected high volume.

Delivering business relevance preferably involves providing an end-to-end transparency of the IT infrastructure, including building a repository of underlying IT elements such as networks, systems, applications and business processes. In addition to the elements the repository may also include implicit and explicit dependencies spread across multiple tiers, relevant attributes and associated business priorities or policies. Self-description services enable transparency as a continuum.

Attaining a self-managed or desired state includes acting based on past experience and captured knowledge. Knowledge services such as root-cause analysis or event correlation provide a backbone to attain the desired state. These services transform real-time and historical information into past experience and use it along with the business objectives, for example, embedded in the information model policies, to make knowledgeable decisions such as inferences.

Infrastructure services provide applications or other services with core services that are not specific to a particular business process, function, or application. Examples of infrastructure services may include exception handling services, data logging services, visualization services, repository service, notification services, persistence services, administrative services, etc.

A business relevance information infrastructure defines a set of concepts, services and components which form the basis of a well-defined environment for the services discussed above. The business relevance information infrastructure includes a common computing and management environment (CCME) and an information model.

The common computing and management environment includes a set of components and services for enabling business relevant management and information delivery. The CCME simplifies the task of constructing interoperable services by defining a high-level, standardized information model and by providing a complete set of common and infrastructural services to support the information model. The CCME effectively provides the unifying environment that allows for quick assembly of new applications or extension of existing applications by providing access to the layered services discussed previously.

Figure 4:
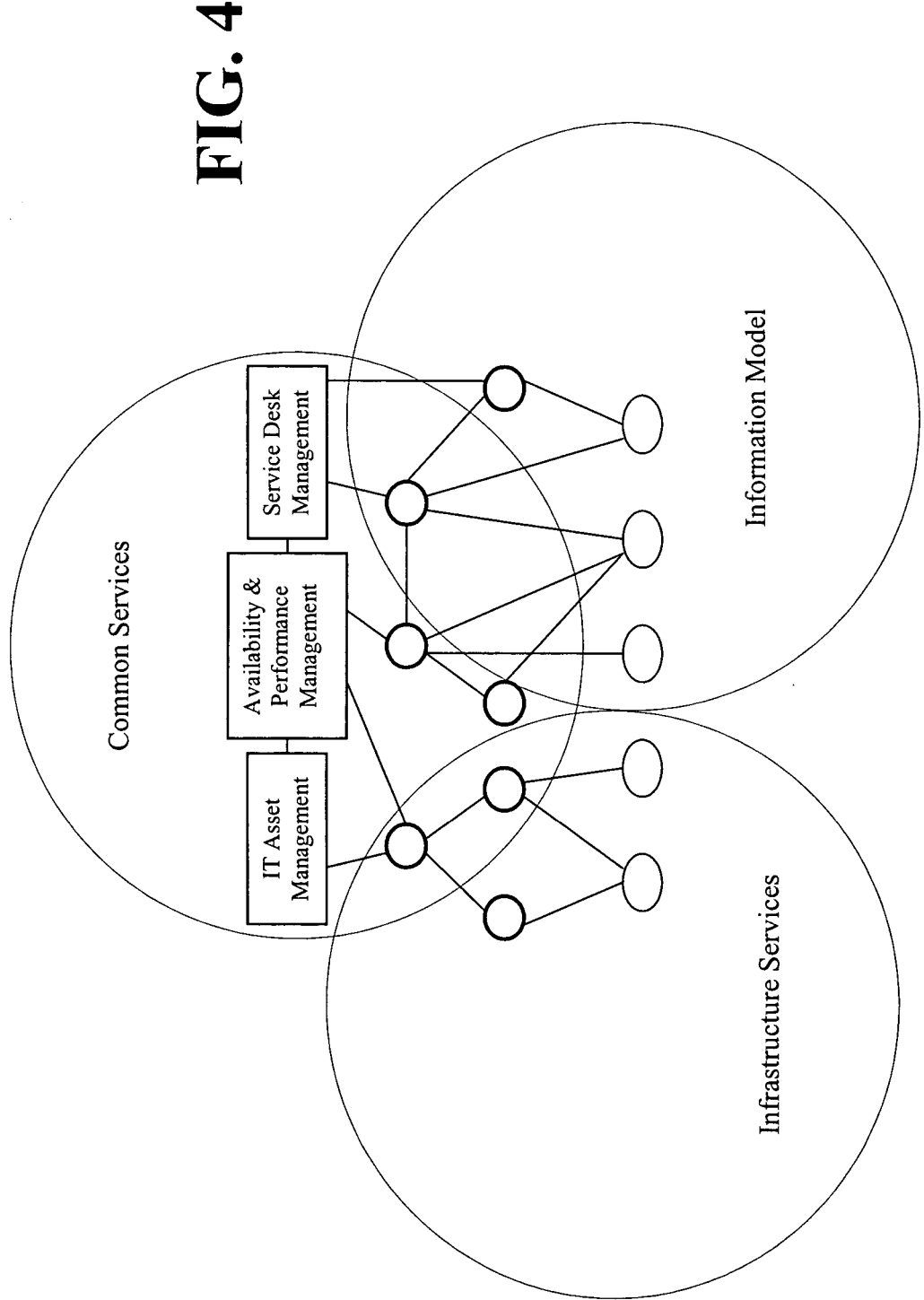
FIG. 4 shows a schematic representation of a common computing and management environment, according to one exemplary embodiment.

FIG. 4 shows a schematic representation of a common computing and management environment, according to one embodiment, as a unifying structure allowing reuse of services and information.

An information model facilitates semantic interoperability using a common meta-model as the basis for a common object model. The common meta-model and object model achieve semantic interoperability for large-scale evolutionary implementations. Syntactically interoperable systems exchange data using agreed upon data formats and structures, share common meaning and reduce the effort for developing interoperable systems. The semantics of an object includes its states, the rules governing its behavior, and the meaning of its interfaces and capabilities. For applications to share a common unit of information, the semantics of the unit are agreed to between the applications. The semantics define the contract to which the various actors adhere when interacting with the information.

The structural organization for the services or major subsystems, according to one embodiment, is further discussed below. The specified pattern is a collaborative adoption of two distinct patterns.

Business relevance management software typically is an enterprise application that is composed of a large number of components across multiple levels of abstraction. A structural organization similar to a stack may be used. The architectural pattern is called "layers". This structural organization provides capabilities such as distributed, available, scalable, etc.

Most, if not all, of the subsystems may be in the form of services. The service-oriented architecture fosters capabilities in the resulting system such as being adaptable, evolutionary, interoperable, predictable, agile, etc.

The architecture baseline for business relevance IT management preferably is a composite of layers pattern and service-oriented architectural pattern (layered services pattern). It encourages exposure of discrete business functionality in the form of well-defined self-describing services. To further reduce the complexity and increase re-use of services across different business domains guidelines maybe established to organize the services in layers.

Figure 5:
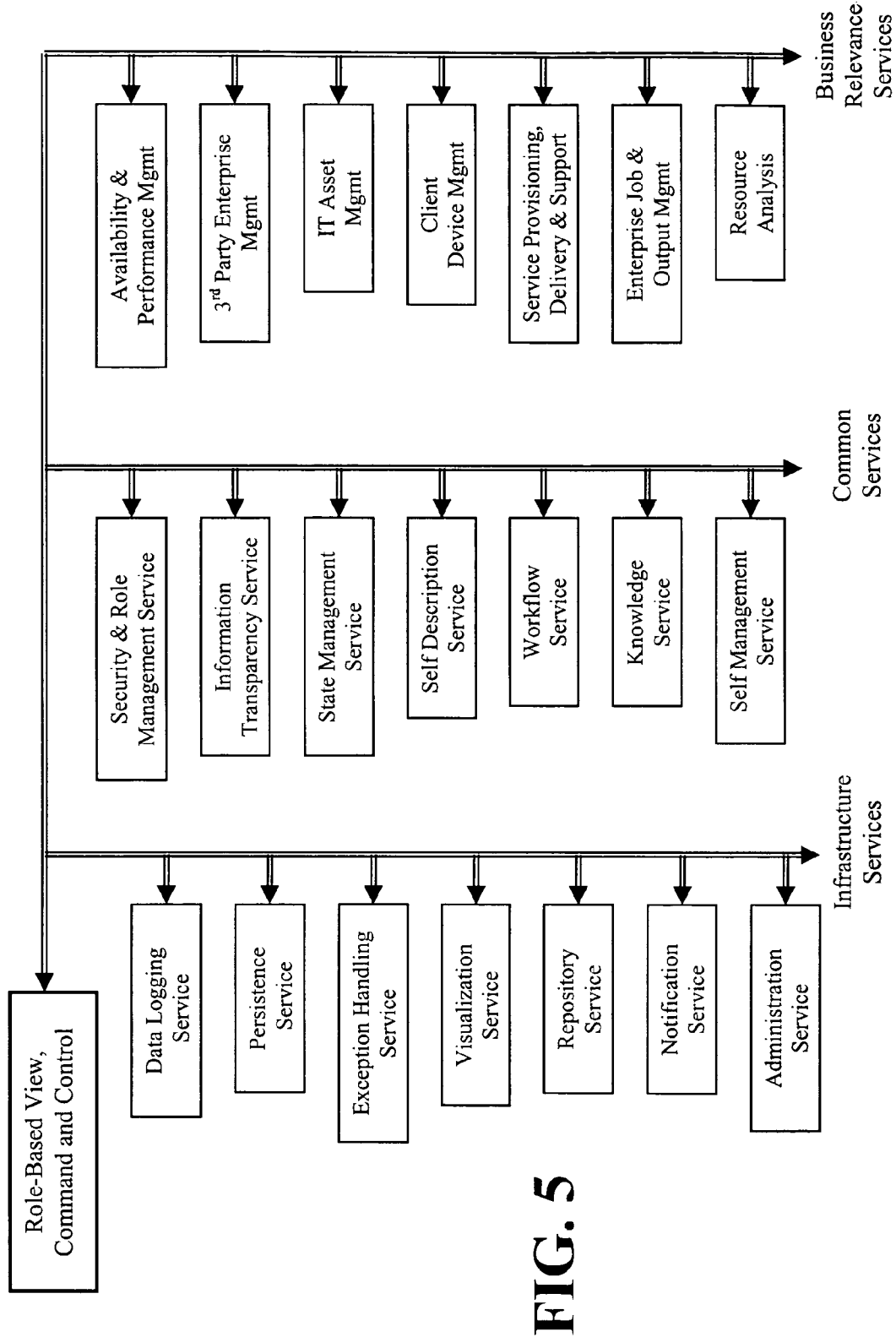
FIG. 5 shows a schematic representation of a layered services architecture, according to one exemplary embodiment.

FIG. 5 shows a schematic representation of a layered services architecture supporting the organization and use of the various service layers previously discussed.

An adapted pattern-oriented software architecture may be used as a standardized format. The format uses context, problem and solution framework as basic elements. The context states the situation(s) that leads to an establishment of a problem that is to be solved. The problem section states the general nature of the problem and some specific aspects of the problem that the solution should address. The solution framework shows how to solve the problem taking into consideration the specific aspects identified in the problem definition.

The layers pattern helps to structure the applications that can be decomposed into groups of subtasks in which each group of subtasks is at a particular level. The context is that a business relevance IT management system is a large and complicated system which is preferably decomposed and organized into smaller subsystems. The solution for building a large and complicated system preferably balances forces such as the following: the resulting system supports the capabilities of being distributed, available, scalable; layers built for today's system are usable by tomorrow's systems; and layering supports evolution of individual layers or the "contained components" in the layer.

The layers pattern can be followed by separating the solution components into layers. Layers promote distribution across multiple physical boundaries to provide scalability, distributed support and availability. Granularity of function and the level of abstraction provided by each layer ensure evolution and re-use. There have been several successful instantiations of this pattern, for example, TCP/IP stack, operation systems, etc.

Figure 6:
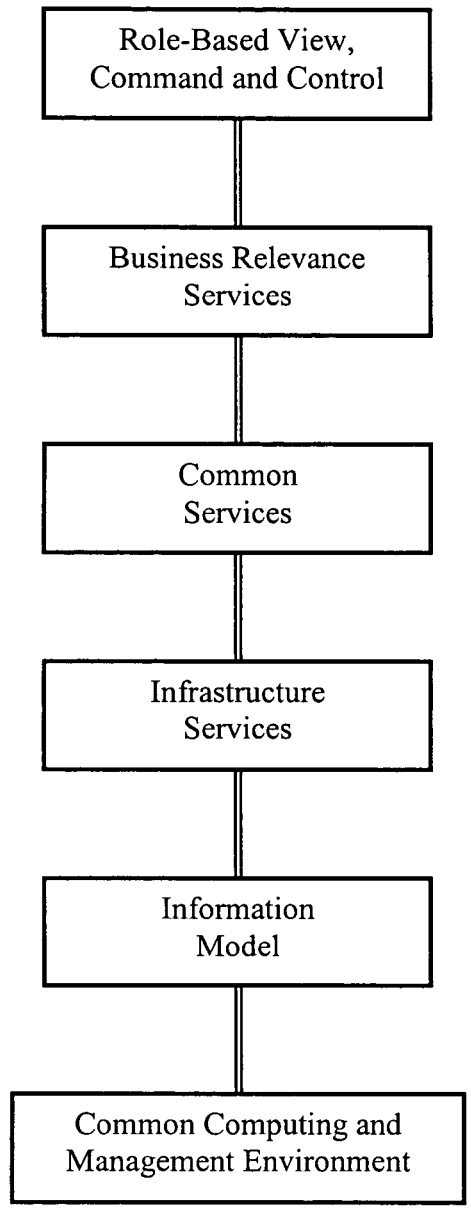
FIG. 6 shows a schematic representation of a layered application scheme, according to one exemplary embodiment.

FIG. 6 depicts a schematic representation of a layered application scheme applied to a business relevant IT management, according to one embodiment.

Service oriented architectural pattern is defined as a collection of services that follow a standardized definition of a software part called "service", are used, deployed and available across the enterprise to provide higher level business functions. The context is that a business relevant IT management system is decomposed into a set of services with relationships that span across multiple layers. The solution for decomposition of the system into a collection of services balances forces such as the following: service-oriented architectures foster seamless integration and interoperability of business functions across the enterprise; service-oriented architectures encourage adequate granularity and abstraction for the services to enable the building of new applications as an assembly of existing services and to provide exchangeability to enhance existing services; service-oriented architectures provide mechanisms for different services to support uniform and ubiquitous definition, access and independence of consumption.

Service oriented architecture can be realized through a definition of a set of standards and a set of common and infrastructure services that support the standards. A web services framework, including related technologies (for example, XML, WSDL, SOAP, UDDI etc), may be used to build the service oriented architecture. The basic notions defined in the web services framework supports requestor's independence by providing services to either end-user applications or other services through accepted and well-established standards for publishing and discovering service access points or interfaces. Services can be a preferred way to expose discrete business relevance management functions and therefore can be used to develop applications that support management of business processes. After the infrastructure and common services are in place, new applications are no longer developed from scratch but rather are assembled from a set of existing services.

Strategies for operational effectiveness or software engineering are preferably built upon evolutionary approaches (as opposed to wholesale replacement). As patterns emerge as a means of organizing structural elements and best practices in architecture, maturity models also emerge as a way of defining standard mechanisms for managing change across people, process and technology.

The first level of business relevance capability includes the following: automatic discovery which includes discovery of all managed components, and mapping of dependency relationships; business process view of the IT infrastructure, such that discovered components are viewable within the context of the business process using or depending upon the components; self-healing, that is, management products and components are enabled for self-corrective action, such as to repair an installation if a component is inadvertently deleted or disabled, or to restart services or daemon processes which are inadvertently stopped; service aware, that is management products and components have the ability to directly interact with helpdesk systems to, for example, automatically open trouble tickets when self-corrective activity fails or is insufficient or incomplete; self-installing and self-configuring, that is, management products and components are enabled for quiet or keyless install, thus enabling just-in-time and on-demand deployment by software delivery solutions, and once installed, the products provide a level of self-configuration that extends at least to discovering the requisite elements of the target managed environment.

Self-management, self-installation, self-maintenance and self-healing are described also in commonly owned U.S. Provisional Application No. 60/486,793, filed Jul. 11, 2003 and entitled "SELF MANAGEMENT INCLUDING GENETIC SELF MANAGEMENT", which is incorporated herein in its entirety by reference.

After the management components have been deployed, and relationships have been discovered, the management components observe system performance and establish a baseline of metrics that reflect that performance. This translates to the thresholds that are configured and monitored to detect deviations from the baseline which in turn supplies the management events that, when correlated within the proper business view context, allow for corrective policy execution.

In addition, complete and consistent management coverage is provided at each of the horizontal stacks, including network, system, database, web, and application. Event correlation and policy execution is provided globally across and between the stacks. To have the ability to correlate IT infrastructure events in a business relevant fashion, the relationships within and between the business process views of the infrastructure are extracted, which also enables effective policy execution towards management to a desired state within the business context, not just an isolated IT component context. Transparent views and management capability are provided within the same business context.

Further, some higher-level common components and capabilities including the following can be added: state management services; workflow services; fully described information models and metadata services; role-based context for information views and attendant event correlation and policy execution; higher-level definition of business events that are correlated in context; common computing and management environment.

Thus, higher-level business events can be correlated with lower-level infrastructure events to begin to drive management decisions and policy within their proper business relevant context. For example, dispatching of a technician to fix one of the multiple off-line application servers can be correlated with the business events to understand where the criticality lies from a business perspective.

Additional business relevance capability may be obtained through adding characteristics that enable on-demand computing. By understanding business processes and how IT-delivered services support those processes, the services, and the underlying infrastructure can be enabled to dynamically adapt as business priorities change. An objective is to allow business managers to make purely business decisions, with the underlying IT services adapting to support those decisions. The adaptability spans not only adjusting service levels, but also provisioning new or expanded services as required or needed.

Figure 7:
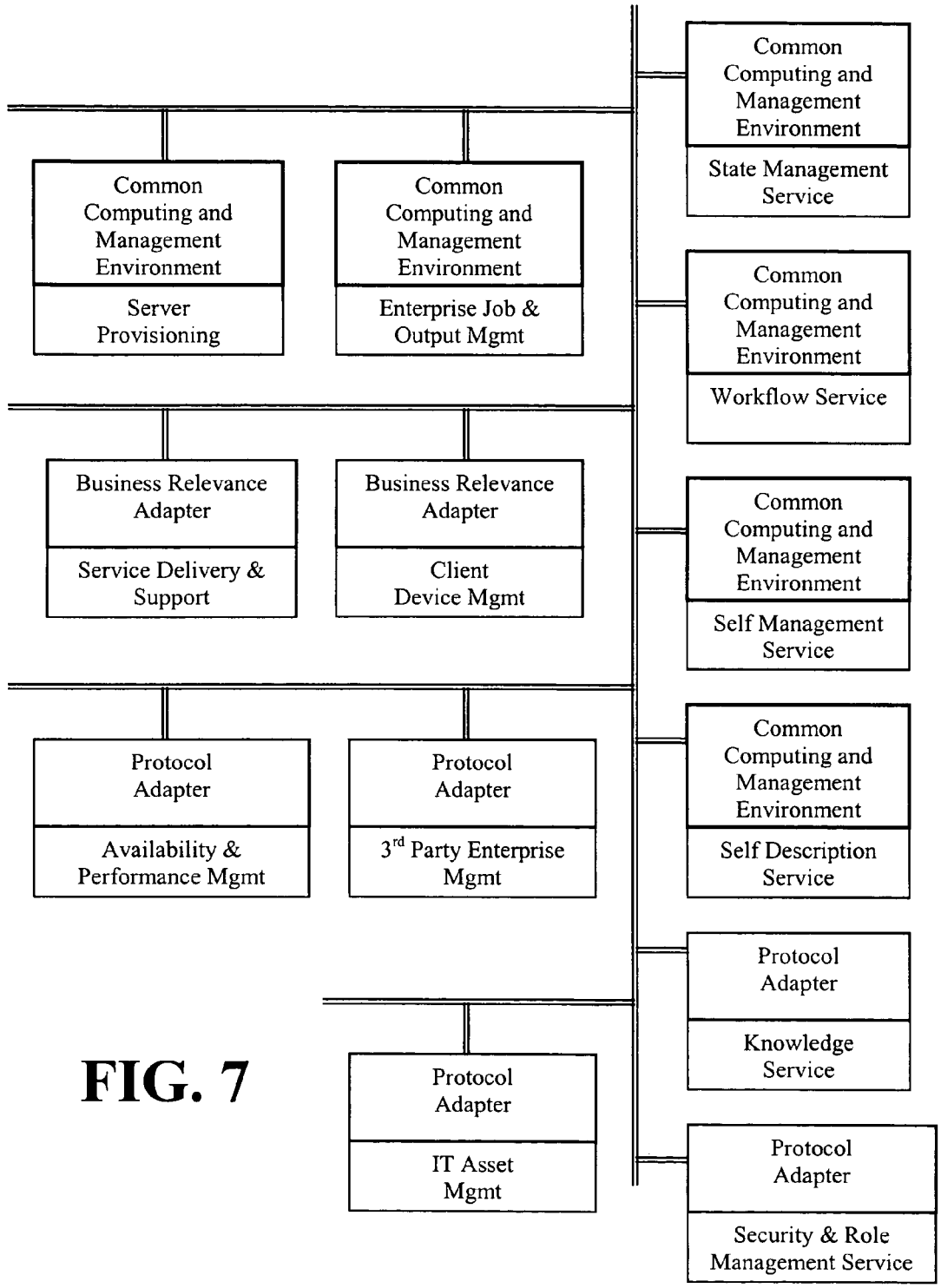
FIG. 7 shows a schematic representation of a business relevance system, according to one exemplary embodiment.

A graphical depiction of coexistence across the different capability levels from a technology perspective might look something like FIG. 7 which shows a schematic representation of one possible system in which products and services at varying levels of adherence to an architectural standard participate in the overall system. Products and services built at varying capability levels can still take advantage of a service-oriented architecture. At the most basic message-passing level, protocol adapters can be provided to plug in legacy events and message traffic. At a higher level, business relevance adapters begin to expose greater levels of services capability such as workflow services and data transparency services to offer aggregation and transformation of data from various information sources as well as adaptation of functions via web services gateways. At the highest level adherence and participation in the common computing and management environment is provided.

The auto discovery methodologies of this application can save large labor-intensive efforts in the mapping of which pieces of the IT infrastructure are relevant to which business process. This concept can be utilized in, for example, predetermination and presentation of monitoring, availability, performance and management of heterogeneous IT environment as well as business process management and impact. The discovery methodologies can enable automated or on-demand discovery of object relationships that make up a business process or business service.

The tools of this application may be applied to business continuance models and plans. Business continuance describes the processes and procedures an organization puts in place to ensure that essential functions can continue during and after a disaster. Business continuance planning seeks to prevent interruption of mission-critical services, and to reestablish full functioning as swiftly and smoothly as possible. Auto discovery may be applied to develop and maintain business continuance models and plans.

Elements and/or features of different illustrative embodiments may be combined with and/or substituted for each other within the scope of this disclosure and appended claims. The above specific embodiments are illustrative, and many variations can be introduced on these embodiments without departing from the spirit of the disclosure or from the scope of the appended claims.

For example, additional variations may be apparent to one of ordinary skill in the art from reading commonly-owned applications, which are incorporated herein in their entireties by reference:

U.S. Provisional Application No. 60/486,317, filed Jul. 11, 2003 and entitled "MODELING OF APPLICATIONS AND BUSINESS PROCESS SERVICES THROUGH AUTO DISCOVERY ANALYSIS";

U.S. Provisional Application No. 60/486,868, filed Jul. 11, 2003 and entitled "INFRASTRUCTURE AUTO DISCOVERY FROM BUSINESS PROCESS MODELS VIA BATCH PROCESSING FLOWS";

U.S. Provisional Application No. 60/486,603, filed Jul. 11, 2003 and entitled "INFRASTRUCTURE AUTO DISCOVERY FROM BUSINESS PROCESS MODELS VIA MIDDLEWARE FLOWS"; and U.S. Provisional Application No. 60/486,689, filed Jul. 11, 2003 and entitled "NETWORK DATA TRAFFIC AND PATTERN FLOWS ANALYSIS FOR AUTO DISCOVERY".

What is claimed is:

1. A method for managing information technology (IT) through auto discovery analysis to achieve business relevance, comprising:

providing one or more IT services operable to monitor an IT infrastructure and thereby discover managed components of the infrastructure and discover business processes which are supported by the infrastructure; and forming, using a computer system, an object-based information model based on the discovered components and the discovered business processes, the information model modeling one or more mappings of business processes to associated managed components that support the business processes such that a business impact can be determined based on the monitoring.

2. The method of claim 1, wherein the information model includes representations of IT processes.

3. The method of claim 1, further comprising:
collecting business data from one or more data sources;
analyzing the collected business data using the information model; and
predicting one or more business events based on the analysis of the collected business data.

4. The method of claim 3, further comprising automating a response to the one or more predicted business events.

5. The method of claim 3, wherein the predicted business events comprise one or more of the following:
one or more service violations;
one or more information technology outages.

6. The method of claim 3, further comprising providing a view of a business impact of a predicted business event.

7. The method of claim 6, wherein the business impact view comprises one or more of:
prediction of financial impact;
prediction of operational impact; and
prediction of customer impact.

8. The method of claim 6, wherein the business impact view includes a view of projected effect of the predicted business event on one or more of the following:
performance;

service availability;
system configuration;
job management; and
IT asset management.

9. The method of claim 1, wherein the one or more IT services include IT asset management.

10. The method of claim 1, further comprising using the information model for one or more of the following:
client device management;
server provisioning; and
resource analysis.

11. The method of claim 1, further comprising using the information model for one or more of the following:
availability and performance management;
job management;
output management; and
service provisioning, delivery and/or support.

12. The method of claim 1, further comprising providing common services applicable across one or more of business processes, functions and applications.

13. The method of claim 1, further comprising using the information model for one or more of the following:
security services;
information transparency services;
state management services; and
workflow services.

14. The method of claim 1, further comprising using the information model for one or more of the following:
self-management services;
self-description services; and
knowledge services.

15. The method of claim 1, further comprising performing network elements discovery.

16. The method of claim 1, further comprising performing systems discovery.

17. The method of claim 1, further comprising performing network flow discovery.

18. The method of claim 1, further comprising performing batch process discovery.

19. The method of claim 1, further comprising performing middleware integration discovery.

20. The method of claim 1, further comprising providing means for visualizing the information model.

21. A computer system for managing information technology (IT) through auto discovery analysis to achieve business relevance, comprising:
a program storage device readable by the computer system, tangibly embodying a program of instructions; and
a processor operable to execute the program instructions to:
provide one or more IT services operable to monitor an IT infrastructure and thereby discover managed components of the infrastructure and discover business processes which are supported by the infrastructure; and
form an object-based information model based on the discovered components and the discovered business processes, the information model modeling one or more mappings of business processes to associated managed components that support the business processes such that a business impact can be determined based on the monitoring.

22. A method for modeling of applications and business process services through auto discovery analysis, comprising:
performing network elements discovery;
performing systems discovery;
performing network flow discovery;
performing batch process discovery;
performing middleware integration discovery; and
based on the performance of network elements discovery, systems discovery, network flow discovery, batch process discovery, and middleware integration discovery, forming, using a computer system, an object-based information model based on discovered managed components and discovered applications and business processes, the information model modeling one or more mappings of applications and business processes to associated managed components that support the applications and business processes such that a business impact can be determined based on monitoring of an information technology infrastructure that comprises the managed components.

23. A computer system for modeling of applications and business process services through auto discovery analysis, comprising:
a program storage device readable by the computer system, tangibly embodying a program of instructions; and
a processor operable to execute the program instructions to:
perform network elements discovery;
perform systems discovery;
perform network flow discovery;
perform batch process discovery;
perform middleware integration discovery; and
based on the performance of network elements discovery, systems discovery, network flow discovery, batch process discovery, and middleware integration discovery, form an object-based information model based on discovered managed components and discovered applications and business processes, the information model modeling one or more mappings of applications and business processes to associated managed components that support the applications and business processes such that a business impact can be determined based on monitoring of an information technology infrastructure that comprises the managed components.

24. Software for managing information technology (IT) through auto discovery analysis to achieve business relevance, the software being embodied in a computer-readable medium and when executed operable to:
provide one or more IT services operable to monitor an IT infrastructure and thereby discover managed components of the infrastructure and discover business processes which are supported by the infrastructure; and
form an object-based information model based on the discovered components and the discovered business processes, the information model modeling one or more mappings of business processes to associated managed components that support the business processes such that a business impact can be determined based on the monitoring.

25. Software for modeling of applications and business process services through auto discovery analysis, the software being embodied in a computer-readable medium and when executed operable to:
perform network elements discovery;
perform systems discovery;
perform network flow discovery;
perform batch process discovery;
perform middleware integration discovery; and
based on the performance of network elements discovery, systems discovery, network flow discovery, batch process discovery, and middleware integration discovery, form an object-based information model based on discovered managed components and discovered applications and business processes, the information model modeling one or more mappings of applications and business processes to associated managed components that support the applications and business processes such that a business impact can be determined based on monitoring of an information technology infrastructure that comprises the managed components.

26. The system of claim 21, wherein the information model includes representations of IT processes.

27. The system of claim 21, further operable to:
collect business data from one or more data sources;
analyze the collected business data using the information model; and
predict one or more business events based on the analysis of the collected business data.

28. The system of claim 27, further operable to automate a response to the one or more predicted business events.

29. The system of claim 27, wherein the predicted business events comprise one or more of the following:
one or more service violations;
one or more information technology outages.

30. The system of claim 27, further operable to provide a view of a business impact of a predicted business event.

31. The system of claim 30, wherein the business impact view comprises one or more of:
prediction of financial impact;
prediction of operational impact; and
prediction of customer impact.

32. The system of claim 30, wherein the business impact view includes a view of projected effect of the predicted business event on one or more of the following:
performance;
service availability;
system configuration;
job management; and
IT asset management.

33. The system of claim 21, wherein the one or more IT services include IT asset management.

34. The system of claim 21, further operable to use the information model for one or more of the following:
client device management;
server provisioning; and
resource analysis.

35. The system of claim 21, further operable to use the information model for one or more of the following:
availability and performance management;
job management;
output management; and
service provisioning, delivery and/or support.

36. The system of claim 21, further operable to provide common services applicable across one or more of business processes, functions, and applications.

37. The system of claim 21, further operable to use the information model for one or more of the following:
security services;
information transparency services;
state management services; and
workflow services.

38. The system of claim 21, further operable to use the information model for one or more of the following:
self-management services;
self-description services; and
knowledge services.

39. The system of claim 21, further operable to perform network elements discovery.

40. The system of claim 21, further operable to perform systems discovery.

41. The system of claim 21, further operable to perform network flow discovery.

42. The system of claim 21, further operable to perform batch process discovery.

43. The system of claim 21, further operable to perform middleware integration discovery.

44. The system of claim 21, further operable to provide means for visualizing the information model.

* * * * *